US007469897B2

(12) United States Patent
Hiramoto et al.

(10) Patent No.: US 7,469,897 B2
(45) Date of Patent: Dec. 30, 2008

(54) POSITION CONTROL DEVICE FOR MOVING MEMBER

(75) Inventors: Yoshiaki Hiramoto, Yamatokoriyama (JP); Kayo Kamei, Yamatokoriyama (JP); Masatsugu Hatanaka, Kashiwara (JP); Shigeru Yoshida, Nara (JP); Motokazu Nakao, Sakurai (JP)

(73) Assignee: Sharp Kabushiki Kaisha, Osaka (JP)

( * ) Notice: Subject to any disclaimer, the term of this patent is extended or adjusted under 35 U.S.C. 154(b) by 477 days.

(21) Appl. No.: 10/900,425

(22) Filed: Jul. 28, 2004

(65) Prior Publication Data

US 2005/0023748 A1 Feb. 3, 2005

(30) Foreign Application Priority Data

Jul. 29, 2003 (JP) ............................ 2003-281947

(51) Int. Cl.
*F16H 19/04* (2006.01)

(52) U.S. Cl. ..................... 271/314; 414/791.2; 74/422; 74/435; 74/32

(58) Field of Classification Search ................. 271/184, 271/81; 414/791.2; 399/404; 74/422, 435, 74/29–33

See application file for complete search history.

(56) References Cited

U.S. PATENT DOCUMENTS 305,503 A * 9/1884 Boettcher ...................... 74/32
571,679 A * 11/1896 McCullough .................. 74/32
2,097,814 A * 11/1937 Gotz .......................... 446/357
2,771,782 A * 11/1956 Darby .......................... 74/32
3,768,883 A * 10/1973 Kauffman ................... 312/351
4,258,580 A * 3/1981 Lowe .......................... 74/109
5,848,346 A * 12/1998 Takashiro ................... 399/404
5,970,040 A * 10/1999 Bando ....................... 369/30.9
6,041,990 A * 3/2000 Chang ........................ 226/144
6,250,169 B1 * 6/2001 Weisser ..................... 74/89.17
6,343,522 B1 * 2/2002 Hori et al. ...................... 74/422
7,046,955 B2 * 5/2006 Hatanaka et al. ............ 399/405
7,252,618 B2 * 8/2007 Spakowski et al. .......... 475/343
2006/0244207 A1 * 11/2006 Riester et al. ............... 271/207

FOREIGN PATENT DOCUMENTS

JP 4-204668 A 7/1992
JP 8-208098 A 8/1996
JP 8-245048 A 9/1996
JP 11-011779 A 1/1999
JP 2001-31317 A 2/2001

* cited by examiner

*Primary Examiner*—Patrick H Mackey
*Assistant Examiner*—Jeremy Severson
(74) *Attorney, Agent, or Firm*—Birch, Stewart, Kolasch & Birch, LLP

(57) ABSTRACT

A shifter is equipped with a rack and a stopper. A transmission gear transmits power from an electric motor to the rack. A retention pin extends vertically downward from the transmission gear. When the shifter slides to an origin, the retention pin locks the stopper, which causes the electric motor to step out. On detecting the step-out of the electric motor, the position control device recognizes that the shifter has reached the origin (the reference position) and has been fixed at the position, thus setting the shifter position.

21 Claims, 4 Drawing Sheets

POSITION CONTROL DEVICE FOR MOVING MEMBER

CROSS-REFERENCE TO RELATED APPLICATION/PRIORITY

This nonprovisional application claims priority under 35 U.S.C. §119(a) on Patent Application No. 2003-281947 filed in Japan on Jul. 29, 2003, the entire contents of which are hereby incorporated by reference.

BACKGROUND OF THE INVENTION

This invention relates to a device for controlling the movement position of a moving member, such as a shifter which is mounted in an image forming apparatus and which switches output positions of recording paper. In particular, this invention relates to an improvement for setting a moving member to a predetermined reference position (e.g. an origin at one end of its range of movement) with a simple arrangement.

To start with, brief description is made of a conventional image forming (copying) operation by an electrophotographic image forming apparatus as represented by a digital photocopier. First, an original which is stacked on an automatic document feed tray (hereinafter referred to as original tray) is fed into a scanner unit. The scanner unit reads image data of the original, based on which an electrostatic image is formed on a photosensitive drum. On this photo-sensitive drum, the image data are visualized by toner which attaches to the electrostatic image. Next, recording paper which is transported through a paper transport path passes between the photosensitive drum and a transfer roller, so that the toner image on the photosensitive drum is transferred to the surface of the recording paper. Later, while the recording paper passes by a fuser roller, the fuser roller applies heat and pressure so as to fuse the toner image on the recording paper. After the image is formed in this manner, the recording paper is ejected through an output path to an output tray.

Among this type of image forming apparatus, some are equipped with a shifter mechanism. For example, to make a plurality of copies from a single set of originals, the shifter mechanism serves to eject each set of recording paper at different positions on the output tray. Namely, output positions for the respective sets of recording paper are offset from each other in a horizontal direction which is orthogonal to a paper output direction. Owing to the offset output, the recording paper can be picked up from the output tray and readily sorted into the respective sets. As such, Japanese Patent Application Laid-open No. H4-204668 (JP 4-204668 A) discloses an output tray which is movable in horizontal directions which are orthogonal to a paper output direction. In a copying operation for more than one kind of originals, an OC cover (an original cover) is opened and closed in order to change originals. The output tray is arranged to move in conjunction with such opening and closure of the OC cover.

With respect to a shifter mechanism, the shifter mechanism is required to recognize the position of a shifter (a moving member), to switch positions of the shifter in conjunction with a paper output operation, and to set proper output positions of recording paper on the output tray. For this purpose, the shifter position at power-on or force-reset has to be recognized correctly. In the past, a shifter position sensor (a sensor, microswitch or the like based on an optical means) is incorporated to recognize the shifter position. Such a shifter position sensor detects the shifter position at power-on or force-reset, and if the shifter is out of a predetermined reference position, the shifter is moved to the reference position.

Nevertheless, the above conventional arrangement needs a special sensor for detecting the shifter position, and hence a greater number of components. Eventually, the position control device has a complicated structure and demands a higher production cost.

This invention is made in view of the above concerns. An embodiment of the invention provides a position control device for a moving member which can set a moving member (a shifter) to an exact position without a special sensor.

SUMMARY OF THE INVENTION

As a position control device for a moving member, this invention, in its various embodiments, presupposes a position control device for a slidably supported moving member which controls a slide position of the moving member by powering the moving member. This position control device has a first power transmission element provided at the moving member, a second power transmission element for transmitting power from a drive source to the first power transmission element, and a stopper provided at the moving member. The second power transmission element is integrally equipped with a transmission part and a projection. This transmission part is directly connected with the first power transmission element and transmits power from the drive source to the first power transmission element. Besides, when the moving member slides closer to the second power transmission element and reaches a predetermined slide position, the projection locks the stopper and limits a position of the stopper, and thus fixes the moving member at the slide position. To put it another way, the projection fixes the moving member at its slide position by locking the stopper and limiting a position of the stopper, only when the moving member slides in a direction of bringing the stopper closer to the second power transmission element and eventually reaches a predetermined position.

According to this arrangement, when the second power transmission element transmits power from a drive source to the first power transmission element, the moving member slides in an acting direction of the power. By way of example, if adopted in a shifter mechanism of an image forming apparatus, the position control device is capable of switching output positions of recording paper in conjunction with the sliding movement. In the case where the slide position of the moving member needs to be detected (in the case where the image forming apparatus is turned on or forcibly reset), power is transmitted from the second power transmission element to the first power transmission element, thereby allowing the moving member to slide in a direction of bringing the stopper closer to the second power transmission element. Later, when the moving member slides to a predetermined slide position, the projection locks the stopper and limits a position of the stopper, thereby fixing the moving member at the slide position. Namely, it is possible to control the position of the moving member by taking the slide position of the thus fixed moving member as a reference position of the moving member. Therefore, the position of the moving member can be fixed at a predetermined reference position without a special sensor for detecting the position of the moving member.

In this arrangement, the first power transmission element may be a rack which is provided along sliding directions of the moving member. The transmission part of the second power transmission element may be a sector gear which rotates in mesh with the rack and thus powers the moving member via the rack. In addition, the stopper extends orthogonally to the sliding directions of the moving member, and the projection locates away from a rotation shaft of the second power transmission element. When the moving member slides to a predetermined slide position, the stopper may move into a space between the projection and the transmission part of the second power transmission element, and the projection may establish contact with the stopper and may limit a position of the stopper.

While the position of the moving member is fixed, the projection and the transmission part can be disposed in the following arrangement. When the projection locks the stopper and limits a position of the stopper, the stopper may be interposed between the projection and the transmission part which maybe opposed to each other in the sliding directions of the moving member. In other words, the projection and the transmission part locate on either side of the stopper (on either side in the sliding directions of the moving member), respectively. Owing to this arrangement, the position of the moving member can be fixed at the reference position without fail.

Moreover, in order to fix the moving member at the reference position, the following specific arrangement is available. In a state where the moving member slides to a predetermined slide position at which the stopper moves in between the projection and at which the transmission part (the sector gear) and the projection establishes contact with the stopper, the second power transmission element may be driven further so as to press the projection against the stopper.

The contact force of the projection against the stopper acts as a fixing force for fixing the moving member at the reference position. This arrangement can increase the contact force by pressing the projection against the stopper, thereby stabilizing the stop position of the moving member.

Further, the slide position of the moving member where the projection locks the stopper and limits a position of the stopper may be set as an origin for the moving member. This origin may be taken as a reference for controlling the slide position of the moving member.

According to this arrangement, an origin can be set as a position where the projection locks the stopper in order to fix the moving member. On the other hand, a steady position for the moving member can be set as a slide position to which the moving member moves from the origin by a predetermined amount. In particular, suppose that the moving member is fixed at the origin, with use of an electric motor as the drive source. In this case, the moving member which has reached the origin does not slide any further even though the electric motor transmits power to the second power transmission element. Eventually, the electric motor steps out. Namely, such step-out of the electric motor indicates that the moving member has reached the origin and has been fixed at the position.

Regarding the power transmission system to the moving member, the following action may occur at the moment when the projection locks the stopper. Namely, when the projection locks the stopper and limits a position of the stopper, the transmission part of the second power transmission element maybe disengaged from the first power transmission element. To put it differently, once the projection locks the stopper, there is no power transmission from the second power transmission element to the first power transmission element, and the slide position of the moving member is limited merely by the locking of the stopper with the projection. Now, suppose that the projection has locked the stopper and power is still transmitted from the second power transmission element to the first power transmission element. Under such circumstances, if the sliding amount of the moving member due to the power transmission is not equal to the sliding amount of the moving member due to the locking of the stopper with the projection, these power transmission points will receive such a heavy load that any of the components may possibly break. In contrast, according to this solution, power transmission from the second power transmission element to the first power transmission element stops once the projection locks the stopper. As a result, this arrangement is free from such a load and can prevent breakage of the position control device.

Regarding a specific application of a position control device according to any of the above arrangements, the device can be mounted in an image forming apparatus and can control a slide position of a shifter (a moving member) which switches output positions of recording paper.

When the image forming apparatus is turned on or forcibly reset, it needs to detect a slide position of the shifter. In this situation, if the position control device according to any of the above arrangements is applied to a shifter mechanism of an image forming apparatus, the shifter can be quickly fixed at the slide position. Hence, it is unnecessary to detect the position of the shifter with a special sensor, thereby simplifying the structure of the image forming apparatus.

Regarding a position control device for a moving member according to this invention, when the moving member moves to a predetermined position (a reference position for position control), movement of the moving member is limited by a part of the power transmission elements which have transmitted power to the moving member. To control the position of the moving member, the thus fixed position is taken as a reference position for the moving member. Hence, it is unnecessary to detect the position of the moving member with a special sensor. Consequently, while attempting to reduce the number of components and to simplify the device structure, this position control device is capable of setting the moving member at a predetermined reference position.

DESCRIPTION OF THE PREFERRED EMBODIMENTS

An embodiment of the invention is hereinafter described with reference to the drawings. In the following embodiment, a position control device according to an embodiment of the invention is applied to a multifunction machine which combines the functions of a copier, a printer and a scanner.

Overall Structure of a Multifunction Machine

Figure 1:
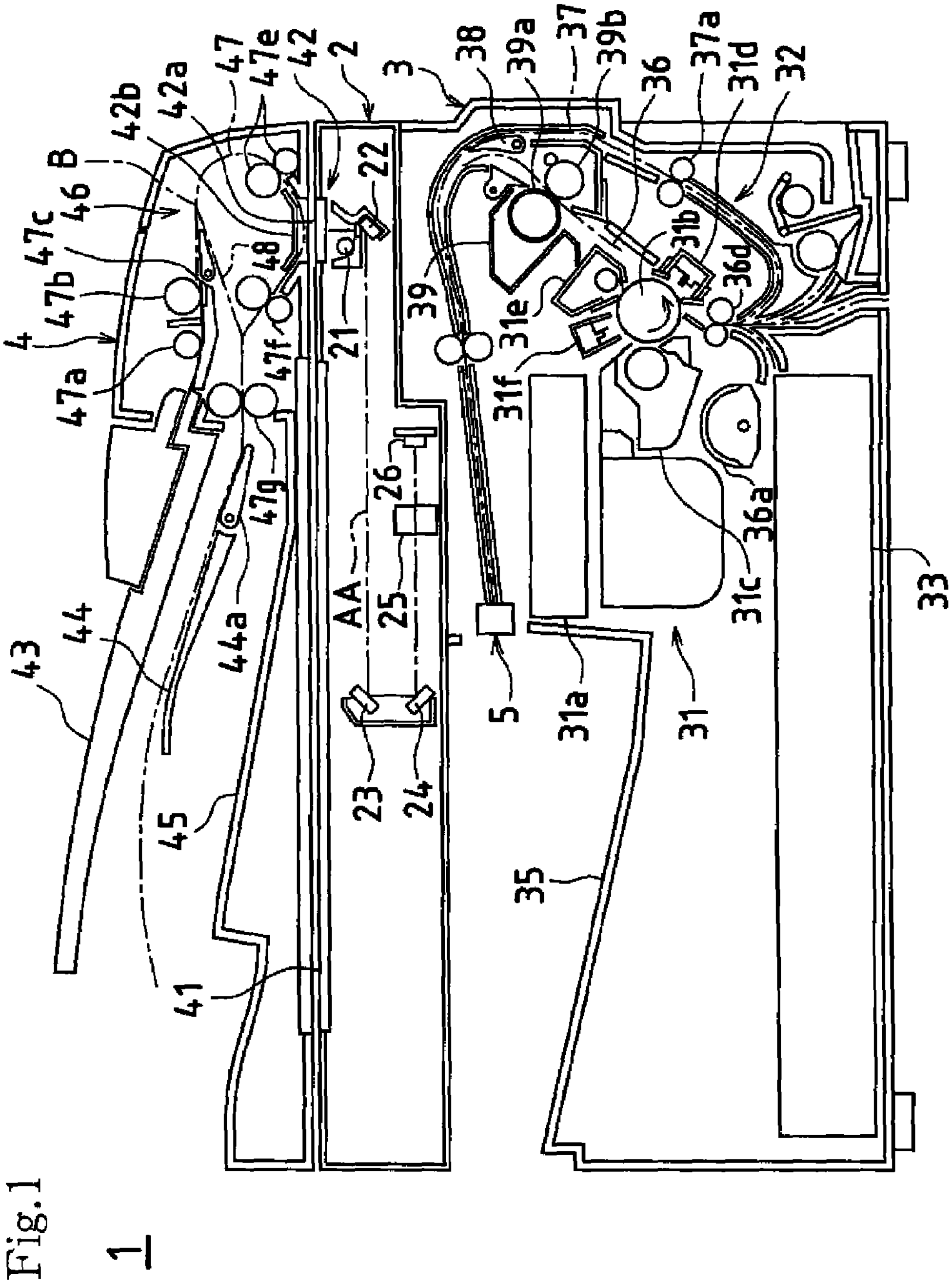
FIG. 1 is a schematic view showing the internal structure of a multifunction machine concerning an embodiment of this invention.

FIG. 1 schematically shows the internal structure of a multifunction machine 1 as the image forming apparatus concerning this embodiment. As shown in FIG. 1, the multifunction machine 1 has a scanner unit 2, a printer unit 3 (an image forming unit), and an automatic document feeder unit 4. Each unit is described below.

<Scanner Unit 2>

The scanner unit 2 reads the image of an original and creates image data. An original is either placed on a platen 41 made of transparent glass or the like, or fed one sheet after another by the automatic document feeder unit 4. The scanner unit 2 is equipped with an exposure light source 21, a plurality of reflection mirrors 22, 23, 24, an imaging lens 25, and a charge coupled device (CCD) 26.

The exposure light source 21 irradiates an original which is either placed on the platen 41 of the automatic document feeder unit 4 or transported through the automatic document feeder unit 4. The light reflected from the original follows an optical path indicated by the dash-dot line AA of FIG. 1. In this drawing, the light reflected from the original is directed to the left, then downwards, and then to the right toward the imaging lens 25 by the reflection mirrors 22, 23, 24, respectively.

As an image reading operation from an original, when an original is placed on the platen 41 ("fixed sheet type" image reading), the exposure light source 21 and the reflection mirrors 22, 23, 24 horizontally scan the original along the platen 41 in order to read an entire image of the original. On the other hand, when an original is transported through the automatic document feeder unit 4 ("sheet transfer type" image reading), the exposure light source 21 and the reflection mirrors 22, 23, 24 are fixed at the locations shown in FIG. 1. In this case, the image of an original is read as it passes over an original reading part 42 (to be described later) of the automatic document feeder unit 4.

After reflected by the reflection mirrors 22, 23, 24 and passing through the imaging lens 25, the light is guided to the CCD 26, where the reflected light is converted to electric signals (original image data).

<Printer Unit 3>

The printer unit 3 is composed of an image formation system 31 and a paper transport system 32.

The image formation system 31 has a laser scanning unit 31*a* and a photosensitive drum 31*b* which is a drum-shaped image carrier. Based on the original image data converted by the CCD 26, the laser scanning unit 31*a* irradiates the surface of the photosensitive drum 31*b* with a laser beam. The photosensitive drum 31*b* rotates in the direction indicated by an arrow in FIG. 1. In accordance with the laser irradiation by the laser scanning unit 31*a*, an electrostatic image is formed on the surface of the photosensitive drum 31*b*.

Aside from the laser scanning unit 31*a*, the photosensitive drum 31*b* is externally surrounded by a developer (a development mechanism) 31*c*, a transfer unit 31*d* (a transfer mechanism), a cleaner (a cleaning mechanism) 31*e*, a static eliminator (not shown), and a charger unit 31*f*, all of which are circumferentially arranged in this order. The developer 31*c* develops an electrostatic image formed on the surface of the photosensitive drum 31*b* to a visible image by toner (a printing material). The transfer unit 31*d* transfers a toner image formed on the surface of the photosensitive drum 31*b* to image formation paper (a recording medium). After toner transfer, the cleaner 31*e* removes any toner remaining on the surface of the photosensitive drum 31*b*. The static eliminator removes residual charges on the surface of the photosensitive drum 31*b*. The charger unit 31*f* charges the surface of the photosensitive drum 31*b* to a given electric potential prior to formation of an electrostatic image.

In this image formation system 31, an image is formed on image formation paper in the following cycle. To start with, the charger unit 31*f* charges the surface of the photosensitive drum 31*b* to a given electric potential. Then, based on image data of an original, the laser scanning unit 31*a* irradiates the surface of the photosensitive drum 31*b* with a laser beam. Next, the developer 31*c* develops a visible image by toner on the surface of the photosensitive drum 31*b*. Later, the transfer unit 31*d* transfers the toner image on image formation paper. Lastly, the cleaner 31*e* removes any toner remaining on the surface of the photosensitive drum 31*b*, and the static eliminator removes residual charges from the surface of the photosensitive drum 31*b*. These steps make up a cycle of image forming operation (print operation) on image formation paper. Repetition of this cycle enables successive image formation on more than one sheet of image formation paper.

Referring next to the paper transport system 32, this system transports image formation paper one sheet after another from a paper cassette 33 (a paper holder) and have an image formed thereon by the image formation system 31. After image formation, the paper transport system 32 ejects the image formation paper to an output tray 35 (a paper output part).

This paper transport system 32 is composed of a main transport path 36 and a reverse transport path 37. One end of the main transport path 36 is opposed to the output side of the paper cassette 33, and the other end is opposed to the output tray 35. The reverse transport path 37 is joined with the main transport path 36, one end at the upstream side (the lower section in FIG. 1) of the transfer unit 31*d* and the other end at the downstream side (the upper section in FIG. 1) of the transfer unit 31*d*.

A pickup roller 36*a* having a semicircular cross-section locates at the upstream end of the main transport path 36 (a section opposed to the output side of the paper cassette 33). With rotation of this pickup roller 36*a*, image formation paper stored in the paper cassette 33 can be intermittently fed to the main transport path 36 one sheet after another.

Along the main transport path 36, resist rollers 36*d*, 36*d* are provided upstream of the transfer unit 31*d*. These resist rollers 36*d*, 36*d* deliver image formation paper in alignment with a toner image on the surface of the photosensitive drum 31*b*. Further along the main transport path 36, a fuser 39 is provided downstream of the transfer unit 31*d*. The fuser 39 has a pair of fuser rollers 39*a*, 39*b* and thermally fuses a toner image which is transferred to the image formation paper. At the downstream end of the main transport path 36, there is an output mechanism 5 for ejecting image formation paper to the output tray 35. The output mechanism 5 will be mentioned later.

A switcher claw 38 is provided at an upstream end of the reverse transport path 37 where it joins the main transport path 36. The switcher claw 38 is freely swingable around a horizontal shaft between a first position (shown in solid line in FIG. 1) and a second position to which the switcher claw 38 swings counterclockwise from the first position in order to open the reverse transport path 37. When the switcher claw 38 is at the first position, image formation paper is transported to the output tray 35. On the other hand, when it is at the second position, image formation paper is sent to the reverse transport path 37. In the case where image formation paper is sent to the reverse transport path 37 (by so-called switch-back transport), the image formation paper is transported by transport rollers 37*a* which are disposed along the reverse transport path 37. At the upstream side of the resist rollers 36*d*, this image formation paper is reversed and sent again through the main transport path 36 toward the transfer unit 31*d*. This time, an image is formed on the reverse side of the image formation paper.

<Automatic Document Feeder Unit 4>

The automatic document feeder unit 4 is a so-called automatic double-sided original transport device. The automatic document feeder unit 4 is available for the sheet transfer type image reading, and is composed of an original tray 43 (an original stacking part), a middle tray 44, an original ejection tray 45 (an original ejection part), and an original transport system 46 for transporting an original to and from the trays 43, 44, 45.

The original transport system 46 contains a main transport path 47 and an auxiliary transport path 48. The main transport path 47 sends an original from the original tray 43, via the original reading part 42, to the middle tray 44 or to the original ejection tray 45. The auxiliary transport path 48 feeds an original from the middle tray 44 to the main transport path 47.

An original pickup roller 47*a* and an alignment roller 47*b* are provided at the upstream end of the main transport path 47 (a section opposed to the output side of the original tray 43). An alignment plate 47*c* lies under the alignment roller 47*b*. Along with the rotation of the original pickup roller 47*a*, one of the originals stacked on the original tray 43 is drawn between the alignment roller 47*b* and the alignment plate 47*c* and fed into the main transport path 47. PS rollers (Paper Stop rollers) 47*e*, 47*e* are disposed down stream of a joint where the main transport path 47 meets the auxiliary transport path 48 (Point B in FIG. 1). The PS rollers 47*e*, 47*e* feed an original to the original reading part 42, with adjusting the leading end of the original to the image reading timing of the scanner unit 2. Namely, when the PS rollers 47*e*, 47*e* receive an original, they stop transport of the original temporarily. Later, with the above-mentioned timing adjusted, the PS rollers 47*e*, 47*e* feed the original to the original reading part 42.

The original reading part 42 is equipped with a platen glass 42*a* and an original hold-down plate 42*b*. While an original fed from the PS rollers 47*e*, 47*e* passes between the platen glass 42*a* and the original hold-down plate 42*b*, light from the exposure light source 21 irradiates the original through the platen glass 42*a*. This is when the scanner unit 2 acquires image data of the original. The original hold-down plate 42*b* is biased at the back face (the top face) by a coil spring (not shown). As a consequence, the original hold-down plate 42*b* maintains contact with the platen glass 42*a* under a certain pressure, and thereby prevents the original from floating over the platen glass 42*a* while the original passes the original reading part 42.

Located downstream of the platen glass 42*a* are transport rollers 47*f* and original ejection rollers 47*g*. After passing over the platen glass 42*a*, the original travels through the transport rollers 47*f* and the original ejection rollers 47*g* to be ejected to the middle tray 44 or the original ejection tray 45.

A middle-tray swing plate 44*a* situates between the original ejection rollers 47*g* and the middle tray 44. The middle-tray swing plate 44*a* is capable of swinging around its edge beside the middle tray 44, between Position 1 (shown in solid line in FIG. 1) and Position 2 to which the middle-tray swing plate 44*a* flips up from Position 1. With the middle-tray swing plate 44*a* up at Position 2, an original ejected from the original ejection rollers 47*g* is delivered to the original ejection tray 45. On the other hand, with the middle-tray swing plate 44*a* lying at Position 1, an original ejected from the original ejection rollers 47*g* exits to the middle tray 44. When an original exits to the middle tray 44, an edge of the original remains held between the original ejection rollers 47*g*, 47*g*. From this state, the original ejection rollers 47*g* rotate in reverse and send the original to the auxiliary transport path 48, thus returning the original to the main transport path 47 via the auxiliary transport path 48. With respect to this reverse rotation of the original ejection rollers 47*g*, the feeding of an original to the main transport path 47 is adjusted to the image reading timing. In this manner, an image on the reverse side of the original is read by the original reading part 42.

<Basic Operations of the Multifunction Machine>

The above-described multifunction machine 1 performs following operations. As a printer, the multifunction machine 1 receives data for printing (image data or text data) which are transmitted from a host device such as a PC. The received data for printing (print data) are temporarily stored in a buffer or memory (not shown). Thus, the print data are stored in the buffer and then successively read out from the buffer. Based on the read-out print data, the printer unit 3 forms an image on image formation paper according to the image formation operation as mentioned above.

As a scanner, the multifunction machine 1 reads the image of an original by the scanner unit 2 and temporarily stores its scan image data in the buffer. Thus, the scan image data are stored in the buffer and successively transmitted to the host device, so that the image can be shown on a display or the like of the host device.

As a copier, the multifunction machine 1 obtains image data of an original by the above scanner function. Based on the original image data, it forms an image on image formation paper by the image formation operation of the printer unit 3.

<Output Mechanism 5>

The output mechanism 5 locates at the downstream end of the main transport path 36 and, after image formation, ejects image formation paper to the output tray 35. The output mechanism 5 has a shifter mechanism for ejecting the image formation paper to different positions on the output tray 35. For example, to make a plurality of copies from a single set of originals, output positions for the respective sets of recording paper are offset from each other in a horizontal direction which is orthogonal to a paper output direction. Owing to the offset output, recording paper can be picked up and readily sorted into the respective sets. This output mechanism 5 is detailed below.

Figure 2:
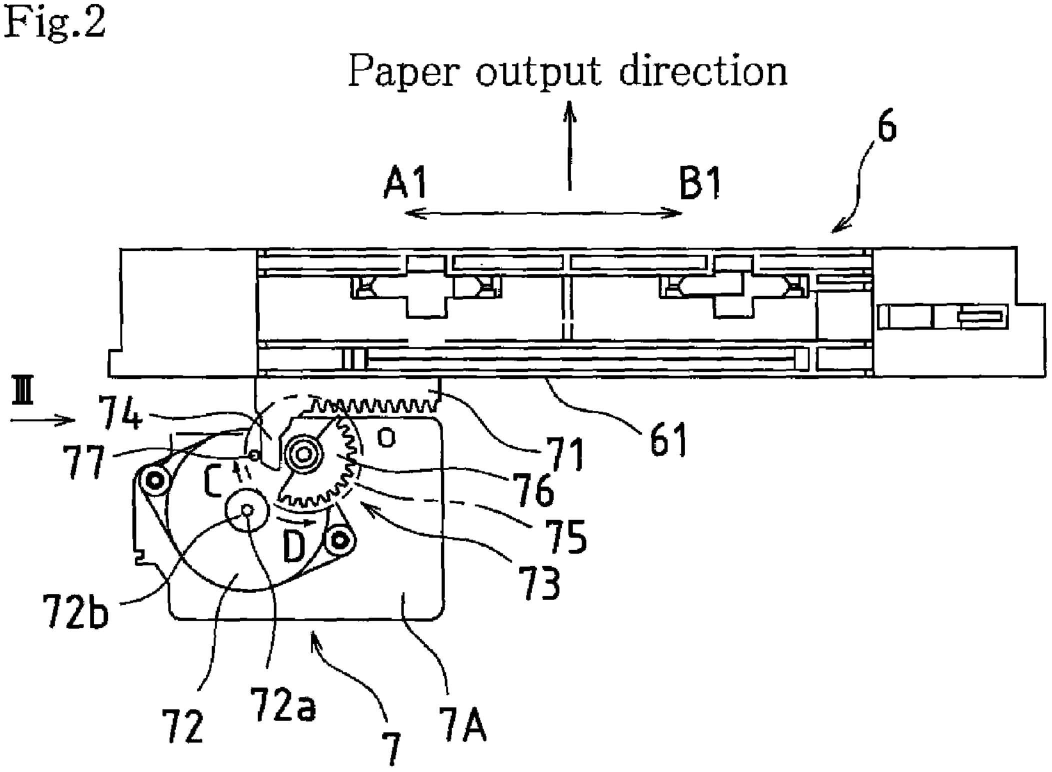
FIG. 2 is a plan view of a shifter and a position control device concerning the embodiment of this invention.
Figure 3:
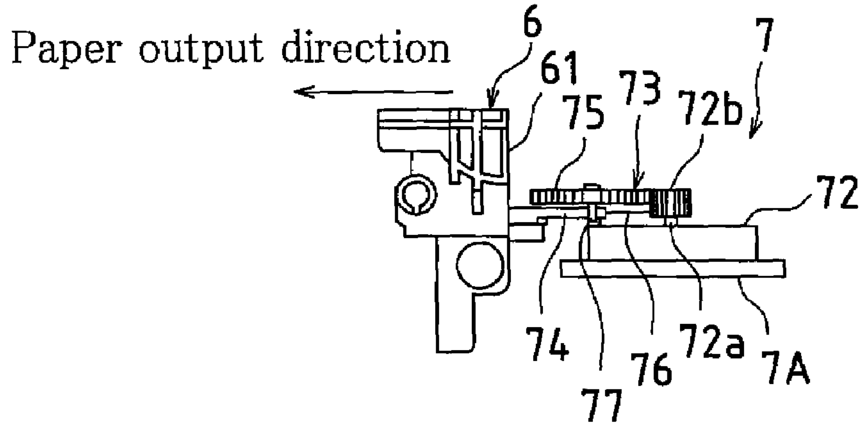
FIG. 3 is a side view taken in the direction of Arrow III in FIG. 2.

FIG. 2 is a plan view showing a shifter 6 (a moving member) provided in the output mechanism 5, and a position control device 7 for sliding the shifter 6. FIG. 3 is a side view taken in the direction of Arrow III in FIG. 2.

As illustrated in these drawings, the shifter 6 is a substantially cuboidal member and has a pair of ejection rollers (not shown). These ejection rollers hold image formation paper therebetween and eject the paper to the output tray 35. In a machine body (not shown), the shifter 6 is supported in such a manner as to reciprocate (slide) freely in its lengthwise directions (horizontal directions which are orthogonal to the paper output direction, as indicated by Arrows A, B in FIG. 2). The position of the shifter 6 is adjusted by the position control device 7. The arrangement and operation of the position control device 7 for such position control will be mentioned later. Because the shifter 6 slides freely in horizontal directions which are orthogonal to the paper output direction, sliding movement of the shifter 6 is accompanied by displacement of the pair of ejection rollers, with image formation paper being held between them. Consequently, the output positions of recording paper on the output tray 35 can be set optionally in a horizontal direction which is orthogonal to the paper output direction.

The position control device 7 is disposed close to and upstream of the shifter 6 in the paper output direction. The position control device 7 is composed of a rack 71 (a first power transmission element) which is integrally attached to a side surface 61 of the shifter 6, an electric motor 72 (a drive source), a transmission gear 73 (a second power transmission element) which transmits power from the electric motor 72 to the rack 71, and a stopper 74 which is integrated with the rack 71. Each of these components is detailed below.

The rack 71 is screwed or otherwise attached to the shifter 6 at a side surface (a vertical surface) which faces upstream in the paper output direction. On this side surface, the rack 71 locates in either half in the lengthwise direction (on the left in FIG. 2) of the shifter 6. In this arrangement, teeth of the rack 71 project to the upstream side in the paper output direction (toward the transmission gear 73).

Figure 4:
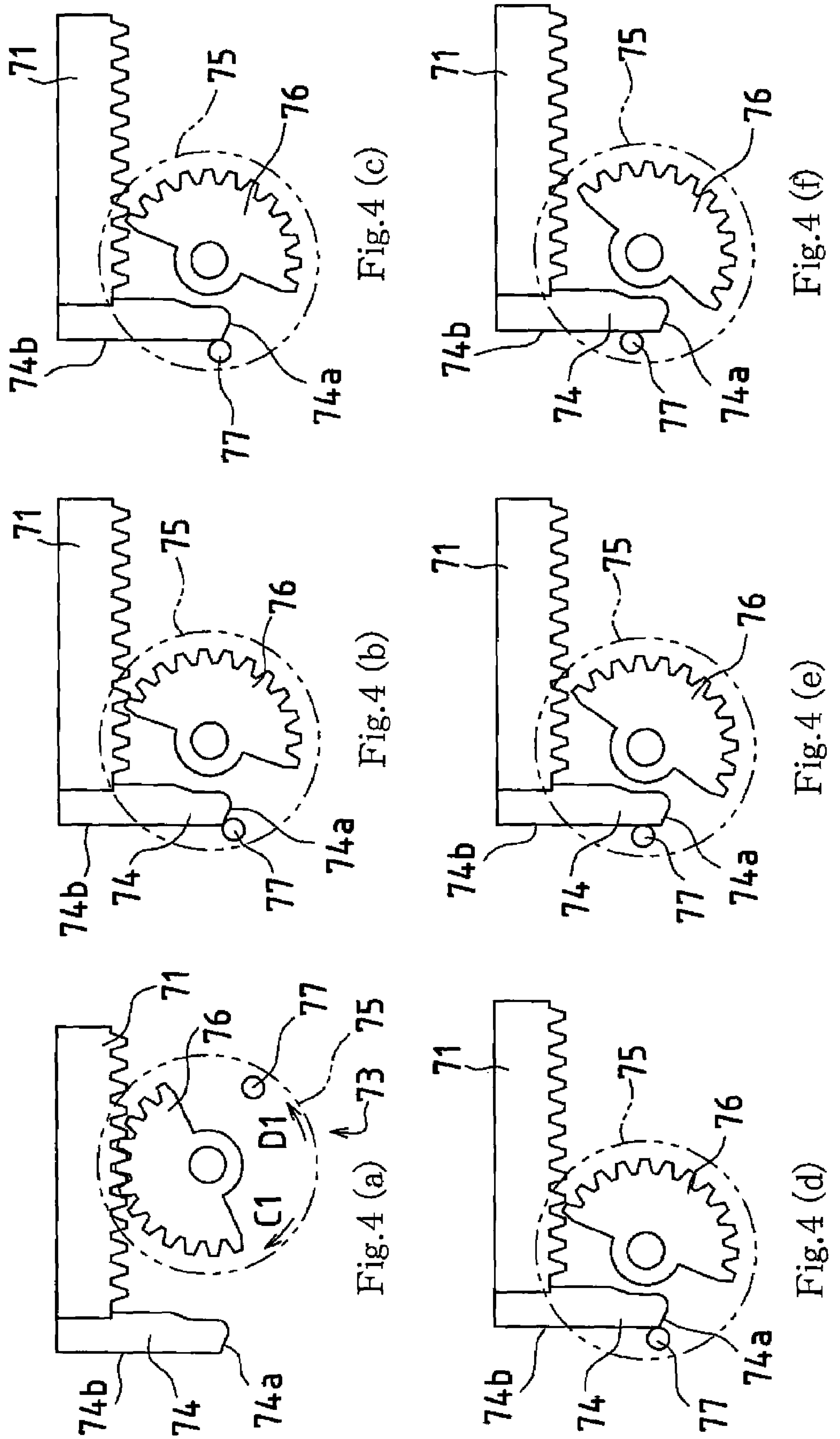
FIGS. 4(*a*)-(*f*) are illustrations for describing an operation of setting a shifter position concerning the embodiment of this invention, wherein the operation is effected in conjunction with rotation of a transmission gear.

Integrated with this rack 71, the stopper 74 is provided to the shifter 6 at a side surface (a vertical surface) which faces upstream in the paper output direction. On this side surface, the stopper 74 locates in either half in the lengthwise direction (on the left in FIG. 2) of the shifter 6. In addition, the stopper 74 is adjacent to the teeth of the rack 71. The stopper 74 projects orthogonally to the sliding directions of the shifter 6, to the upstream side in the paper output direction (namely, extends parallel to a direction which is orthogonal to a rotation shaft of the transmission gear 73 to be mentioned later). As shown in FIG. 4 on an enlarged scale, the extreme end of the stopper 74 protrudes considerably beyond the tips of the teeth of the rack 71. This extreme end is shaped to have a tilted surface 74*a* for guiding a retention pin 77 to be mentioned later. The tilted surface 74*a* slopes down to the outside in the sliding directions of the shifter 6 (to the left in FIG. 4, which is toward the origin or the reference position as mentioned below) and to the downstream side of the paper output direction.

The electric motor 72 is screwed or otherwise attached to a device frame 7A. The electric motor 72 has a drive shaft 72*a* which stands upright and a pulse motor which can optionally regulate the amount of rotation for the drive shaft 72*a*. The drive shaft 72*a* of the electric motor 72 is equipped with a pinion gear 72*b*.

The transmission gear 73 is integrally made of a round gear 75, a sector gear 76, and a retention pin 77 (a projection). In FIG. 2 and FIG. 4, the round gear 75 is shown in phantom line, which means the round gear 75 lies in front (i.e. vertically upward) of the sector gear 76 to be mentioned later.

The round gear 75 is a spur gear which has teeth around the entire periphery. The round gear 75 can freely rotate around a vertical shaft (in directions indicated by Arrows C, D in FIG. 2 and FIG. 4), being in mesh with the pinion gear 72*b* which is mounted on the drive shaft 72*a* of the electric motor 72. Namely, when the electric motor 72 is driven to rotate the drive shaft 72*a*, power is transmitted from the pinion gear 72*b* to the round gear 75. Since the round gear 75 has a greater number of teeth than the pinion gear 72*b*, the driving force from the electric motor 72 is decelerated to be the rotation force of the round gear 75.

The sector gear 76 is integrated at the bottom surface of the round gear 75. The sector gear 76 rotates around the rotation shaft of the round gear 75, and its teeth are formed in the range of about 180 degrees. Namely, the transmission gear 73 has a dual structure of the round gear 75 and the sector gear 76. The outside diameter of the sector gear 76 is slightly smaller than that of the round gear 75. When the rotation driving force of the electric motor 72 is transmitted via the pinion gear 72*b* to the round gear 75, the transmission gear 73 rotates as a whole, accompanied by rotation of the sector gear 76. The teeth of the sector gear 76 are in mesh with the rack 71 only in the range of certain rotation angles. With this meshing engagement, the rotation force of the sector gear 76 is transmitted to the shifter 6 via the rack 71 (e.g. the states in FIGS. 4(*a*), (*b*)).

The retention pin 77 is a columnar element which projects vertically downward from the bottom surface of the round gear 75. On this bottom surface, the retention pin 77 locates in a different area from the sector gear 76. Namely, when the round gear 75 rotates by the rotation driving force of the electric motor 72, the retention pin 77 revolves around the rotation shaft of the round gear 75. The location of the retention pin 77 is described in detail, with reference to FIGS. 4(*b*)-(*f*). While the sector gear 76 transmits power to the rack 71 and causes sliding movement of the shifter 6, the rotation shaft of the transmission gear 73 will move so close to the stopper 74 that the retention pin 77 comes into contact with the tilted surface 74*a* of the stopper 74. With further rotation of the transmission gear 73, the retention pin 77 advances along an external surface 74*b* of the stopper 74. Eventually, the stopper 74 moves in between the sector gear 76 and the retention pin 77.

<Action of the Position Control Device 7>

The action of the position control device 7 of the above structure is now described. When the multifunction machine 1 is turned on or forcibly reset, the slide position of the shifter 6 needs to be recognized. The position control device 7 sets (initializes) the position of the shifter 6 by the following actions.

To start with, the electric motor 72 is driven counterclockwise in FIG. 2, thereby causing the transmission gear 73 to rotate clockwise in FIGS. 2 and 4(*a*) (in the direction of Arrow C ). With this rotation, the rotation driving force of the electric motor 72 is transmitted to the shifter 6, via the pinion gear 72*b*, the round gear 75, the sector gear 76, and the rack 71. As a result, the shifter 6 slides in the direction of Arrow B in FIG. 2, namely, to a predetermined origin.

FIGS. 4(*a*)-(*f*) represent positional relationships of the sector gear 76 and the retention pin 77 relative to the rack 71. As shown in these drawings, as the shifter 6 slides toward the predetermined origin, the stopper 74 moves in between the retention pin 77 and the sector gear 76 which are revolving. When the transmission gear 73 rotates from the state of FIG. 4(*e*) to the state of FIG. 4(*f*), the retention pin 77 presses the external surface 74*b* of the stopper 74. At this moment, the retention pin 77 locates on one side of the stopper 74 and the sector gear 76 locates on the other side of the stopper 74, so that the shifter 6 cannot move beyond this position. Hence, even though the electric motor 72 is energized, the transmission gear 73 fails to rotate, and the electric motor 72 steps out in the end. On detecting the step-out of the electric motor 72, the position control device 7 recognizes that the shifter 6 has reached the origin (the reference position) and has been fixed at the position. The position of the shifter 6 is set (initialized) in this manner.

Still referring to FIGS. 4(*a*)-(*f*), while the transmission gear 73 is rotating, the sector gear 76 is disengaged from the rack 71 at the moment when the retention pin 77 starts to lock the stopper 74. Hence, the meshing engagement between the sector gear 76 and the rack 71 is released at the transition from the state of FIG. 4(*b*) to the state of FIG. 4(*c*).

Now, suppose that the retention pin 77 has locked the stopper 74 and power is still transmitted from the sector gear 76 to the rack 71. Under such circumstances, if the sliding amount of the shifter 6 due to the power transmission is not equal to the sliding amount of the shifter 6 due to the locking of the stopper 74 with the retention pin 77, these power transmission points will receive such a heavy load that any of the components may possibly break. In contrast, according to this embodiment, power transmission from the sector gear 76 to the rack 71 stops once the retention pin 77 locks the stopper

74. As a result, this embodiment is free from such a load and can prevent breakage of the device (the gears, etc.).

The position of the shifter 6 is fixed at the origin when the electric motor 72 steps out in the above manner, and this condition is set as its normal operation position. In an image formation operation which does not call for the shifter function, the shifter 6 is fixed at this normal operation position throughout the above-described image formation operation. In this situation, the stopper 74 is interposed between the retention pin 77 and the sector gear 76 which are opposed to each other in the sliding directions of the shifter 6. In other words, the retention pin 77 is next to one side of the stopper 74 and the sector gear 76 is next to the other side (i.e. the stopper 74 has obstacles on both sides in the sliding directions of the shifter 6). Even when the power to the electric motor 72 is shut down, the position of the shifter 6 can be fixed without fail.

Figure 5:
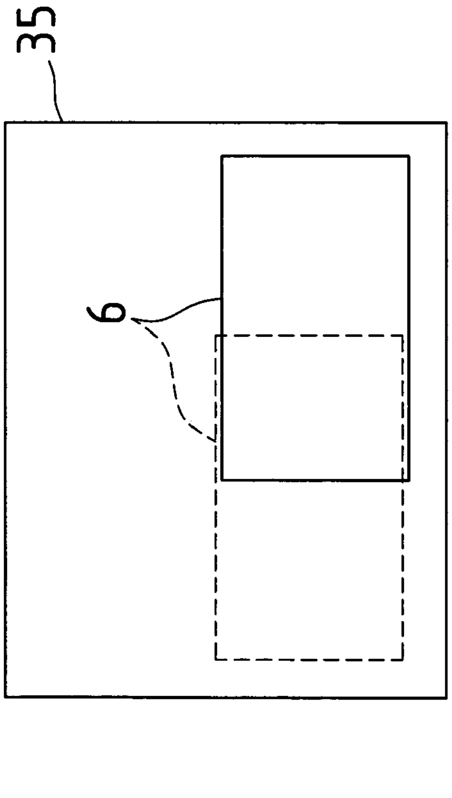
FIGS. 5(*a*)-(*c*) are illustrations for describing reference positions of a shifter, concerning the embodiment of this invention.
Figure 5:
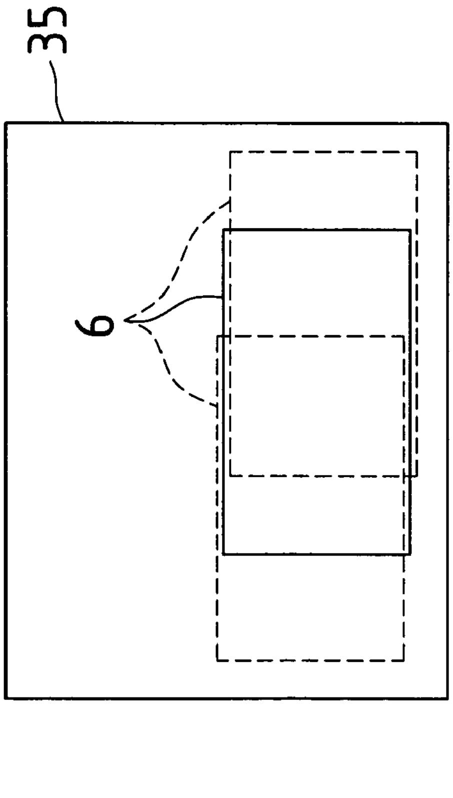
Figure 5:
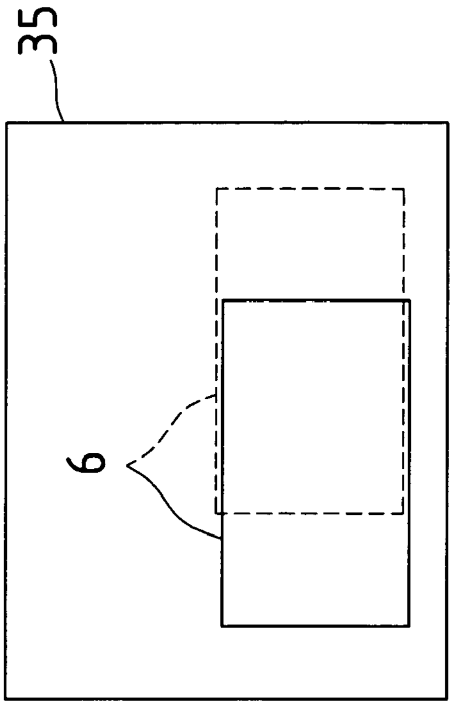

On the other hand, if a user desires an image formation operation with the shifter function, the shifter 6 is allowed to move between the fixed position as defined above, and a slide position to which the shifter 6 slides with the drive of the electric motor 72 (a position displaced by a predetermined amount in the direction of A in FIG. 2). With this movement, paper output positions on the output tray 35 are offset in a horizontal direction which is orthogonal to the paper output direction. Owing to the offset output, recording paper can be picked up from the output tray and readily sorted into respective sets. FIG. 5(*a*) shows positions of the shifter 6 in this situation, in which the solid line represents the shifter 6 at the fixed position (the origin) as mentioned above, whereas the dashed line represents the shifter 6 at a slide position.

FIG. 5(*b*) shows positions of the shifter 6 in the case where three paper output positions are set on the output tray 35.

In FIG. 5(*c*), the reference position of the shifter 6 (indicated by dashed line in FIG. 5(*c*)) is a first slide position to which the shifter 6 fixed at the origin is caused to slide (to the left in the drawing) by a predetermined amount with the driving force of the electric motor 72. In an image formation operation which does not call for the shifter function, the shifter 6 is fixed at this reference position (the first slide position). On the other hand, in an image formation operation which requires the shifter function, the shifter 6 is allowed to move between the reference position (the first slide position indicated by dashed line in FIG. 5(*c*)) and a second slide position (indicated by solid line in FIG. 5(*c*)) to which the shifter 6 slides from the first slide position. Eventually, paper output positions on the output tray 35 are offset in a horizontal direction which is orthogonal to the paper output direction. Also in this case, it is possible to set three paper output positions.

Preferably, the position of the shifter 6 is set to the origin when the multifunction machine 1 is shipped from the factory. This is intended to avoid troubles during shipment of the multifunction machine 1, because, for example, the shifter 6 may slide and break due to shock or other causes. To give a specific example, the shifter 6 may be set at the position shown in FIG. 4(*e*). At the position of FIG. 4(*e*), the retention pin 77 does not press the external surface 74*b* of the stopper 74, thus permitting slight movement of the stopper 74 (i.e. giving play to the stopper 74). This slight play can absorb shock during shipment.

In the above embodiment according to the invention, the position control device for a moving member is applied to a multifunctional image forming apparatus (a multifunction machine) 1 which combines the functions of a copier, a printer and a scanner. Additionally, this invention is applicable, without limitation, to an image forming apparatus with any one of these functions or an image forming apparatus of any other type.

Also in the above embodiment according to the invention, the position control device for a moving member is applied to a shifter mechanism of an image forming apparatus (a multifunction machine). Additionally, this invention is applicable, without limitation, to other slidable moving members in order to control its position.

The invention may be embodied in other specific forms without departing from the spirit or essential characteristics thereof. The above embodiment is therefore to be considered in all respects as illustrative and not restrictive, the scope of the invention being indicated by the appended claims rather than by the foregoing description. All changes which come within the meaning and range of equivalency of the claims are therefore intended to be embraced therein.

What is claimed is:

1. A position control device for a slidably supported moving member, which controls a slide position of the moving member by powering the moving member, said position control device comprising:

a first power transmission element provided at the moving member;

a second power transmission element for transmitting power from a drive source to the first power transmission element; and a stopper provided at the moving member, wherein the second power transmission element is integrally comprised of a round spur gear, a sector gear and a projection, the sector gear has a smaller number of teeth than the round spur gear, the projection is a columnar element which projects vertically downward from a bottom surface of the round spur gear, the projection is positioned in a different portion of the bottom surface of the round spur gear than the sector gear, the sector gear is directly connected with the first power transmission element and transmits power from the drive source to the first power transmission element, and the projection trapping the stopper between the projection and the sector gear when the moving member slides to a predetermined slide position and limiting a position of the stopper.

2. A position control device for a moving member according to claim 1, the first power transmission element being a rack which is provided along sliding directions of the moving member, the sector gear rotating in mesh with the rack and thus powering the moving member via the rack, the stopper extending orthogonally to the sliding directions of the moving member, and the projection being positioned away from a rotation shaft of the second power transmission element, wherein, when the moving member slides to the predetermined slide position, the stopper moves into a space between the projection and the sector gear, and the projection establishes contact with the stopper and limits a position of the stopper.

3. A position control device for a moving member according to claim 1 or 2, wherein when the projection traps the stopper and limits a position of the stopper, the stopper is interposed between the projection and the sector gear which are opposed to each other in the sliding directions of the moving member.

4. A position control device for a moving member according to claim 3, wherein in a state where the moving member slides to the predetermined slide position, the second power transmission element is driven further so as to press the projection against the stopper.

5. A position control device for a moving member according to claim 3, wherein the predetermined slide position of the moving member is set as an origin for the moving member, and the origin is taken as a reference for controlling the slide position of the moving member.

6. A position control device for a moving member according to claim 3, wherein the sector gear is disengaged from the first power transmission element when the projection traps the stopper and limits a position of the stopper.

7. A position control device for a moving member according to claim 3, which is mounted in an image forming apparatus and controls a slide position of a shifter which switches output positions of recording paper.

8. A position control device for a moving member according to claim 1 or 2, wherein in a state where the moving member slides to the predetermined slide position, the second power transmission element is driven further so as to press the projection against the stopper.

9. A position control device for a moving member according to claim 8, wherein the predetermined slide position is set as an origin for the moving member, and the origin is taken as a reference for controlling the slide position of the moving member.

10. A position control device for a moving member according to claim 8, wherein the sector gear is disengaged from the first power transmission element when the projection traps the stopper and limits a position of the stopper.

11. A position control device for a moving member according to claim 8, which is mounted in an image forming apparatus and controls a slide position of a shifter which switches output positions of recording paper.

12. A position control device for a moving member according to claim 1 or 2, wherein the predetermined slide position is set as an origin for the moving member, and the origin is taken as a reference for controlling the slide position of the moving member.

13. A position control device for a moving member according to claim 12, wherein the sector gear is disengaged from the first power transmission element when the projection traps the stopper and limits a position of the stopper.

14. A position control device for a moving member according to claim 12, which is mounted in an image forming apparatus and controls a slide position of a shifter which switches output positions of recording paper.

15. A position control device for a slidably supported moving member, which controls a slide position of the moving member by powering the moving member, said position control device comprising:

a first power transmission element provided at the moving member;

a second power transmission element for transmitting power from a drive source to the first power transmission element; and a stopper provided at the moving member, wherein the second power transmission element is integrally comprised of a round spur gear, a sector gear and a projection, the projection is a columnar element which projects vertically downward from a bottom surface of the round spur gear, the projection is positioned in a different portion of the bottom surface of the round spur gear than the sector gear, the sector gear is directly connected with the first power transmission element and transmits power from the drive source to the first power transmission element, the projection trapping the stopper between the projection and the second power transmission element when the moving member slides to a predetermined slide position and limiting a position of the stopper, the sector gear is disengaged from the first power transmission element when the projection traps the stopper and limits a position of the stopper.

16. A position control device for a moving member according to claim 15, which is mounted in an image forming apparatus and controls a slide position of a shifter which switches output positions of recording paper.

17. A position control device for a slidably supported moving member, which controls a slide position of the moving member by powering the moving member, said position control device comprising:

a first power transmission element provided at the moving member;

a second power transmission element for transmitting power from a drive source to the first power transmission element; and a stopper provided at the moving member, wherein the second power transmission element is integrally equipped with a transmission part and a projection, the transmission part being directly connected with the first power transmission element and transmitting power from the drive source to the first power transmission element, and the projection trapping the stopper between the projection and the second power transmission element when the moving member slides to a predetermined slide position and limiting a position of the stopper, said position control device being mounted in an image forming apparatus and controlling a slide position of a shifter which switches output positions of recording paper.

18. A position control device for a slidably supported moving member, said position control device controlling a slide position of the moving member by powering the moving member, said position control device comprising:

a rack and a stopper connected to the moving member;

a first gear rotatable about an axis by a drive source;

a second gear fixed to a bottom surface of said first gear, rotatable with said first gear and engaging said rack, wherein rotation of said first gear affects a position of said rack; and a pillar projecting orthogonally from the bottom surface of said first gear and spaced from the second gear;

said pillar shifting from a first side of said stopper to a second, opposite side of said stopper as said first gear rotates in a first direction from a first position to a second position.

19. The position control device of claim 18 wherein said pillar engages said second side of said stopper to limit movement of said first gear in said first direction.

20. The position control device of claim 18 wherein said second gear comprises a sector gear.

21. A position control device for a shifter in an image forming apparatus, the shifter switching an output position of recording paper, said position control device comprising:

a first power transmission element provided at the shifter;

a second power transmission element for transmitting power from a drive source to the first power transmission element; and a stopper provided at the shifter, wherein the second power transmission element is integrally comprised of a round spur gear, a sector gear and a projection, the projection is a columnar element which projects vertically downward from a bottom surface of the round spur gear, the projection is positioned in a different portion of the bottom surface of the round spur gear than the sector gear, the sector gear is directly connected with the first power transmission element and transmits power from the drive source to the first power transmission element, and the projection blocking the stopper and limiting a position of the stopper, and thus placing the shifter at a predetermined slide position when the shifter slides closer to the second power transmission element and reaches the predetermined slide position.

* * * * *